United States Patent
Oviedo

(10) Patent No.: US 10,463,094 B2
(45) Date of Patent: Nov. 5, 2019

(54) HAND GLOVE MOBILE SMARTPHONE ANTI-DROP AND ANTI-THEFT PROTECTOR DEVICE, SYSTEM AND METHOD

(71) Applicant: Rosa A. Oviedo, Flushing, NY (US)

(72) Inventor: Rosa A. Oviedo, Flushing, NY (US)

( * ) Notice: Subject to any disclaimer, the term of this patent is extended or adjusted under 35 U.S.C. 154(b) by 0 days.

(21) Appl. No.: 16/126,154

(22) Filed: Sep. 10, 2018

(65) Prior Publication Data
US 2019/0000164 A1 Jan. 3, 2019

Related U.S. Application Data

(63) Continuation of application No. PCT/US2017/020837, filed on Mar. 4, 2017.

(60) Provisional application No. 62/310,057, filed on Mar. 18, 2016.

(51) Int. Cl.
| | |
|---|---|
| *A41D 19/00* | (2006.01) |
| *A45C 11/00* | (2006.01) |
| *H04B 1/3888* | (2015.01) |
| *A45F 5/00* | (2006.01) |
| *H04M 1/02* | (2006.01) |
| *H04B 1/3827* | (2015.01) |

(52) U.S. Cl.
CPC ..... *A41D 19/0037* (2013.01); *A41D 19/0013* (2013.01); *A41D 19/0024* (2013.01); *A45C 11/00* (2013.01); *A45F 5/00* (2013.01); *H04B 1/385* (2013.01); *H04B 1/3888* (2013.01); *H04M 1/0202* (2013.01); *A41D 2400/48* (2013.01); *A45C 2011/002* (2013.01); *A45F 2005/002* (2013.01); *A45F 2200/0516* (2013.01); *H04B 2001/3861* (2013.01)

(58) Field of Classification Search
CPC ............ A41D 19/0037; A41D 19/0013; A41D 19/0024; A41D 2400/48; H04B 1/385; H04B 1/3888; H04B 2001/3861; H04M 1/0202; A45F 5/00; A45F 2005/002
USPC ....................................................... 455/575.1
See application file for complete search history.

(56) References Cited

U.S. PATENT DOCUMENTS

| | | | | |
|---|---|---|---|---|
| 2006/0212990 | A1* | 9/2006 | Mattesky | A41D 19/0006 2/161.6 |
| 2007/0101479 | A1* | 5/2007 | Turner | A41D 19/002 2/159 |
| 2008/0307559 | A1* | 12/2008 | Wright | A63B 71/141 2/161.1 |
| 2014/0073376 | A1* | 3/2014 | Noble Nava | H04B 1/385 455/575.6 |
| 2015/0052660 | A1* | 2/2015 | Chapman | A45F 5/00 2/160 |
| 2015/0074868 | A1* | 3/2015 | MacK | A41D 19/001 2/161.1 |
| 2015/0237181 | A1* | 8/2015 | Khan | H04M 1/0202 455/556.1 |

* cited by examiner

*Primary Examiner* — William Nealon
(74) *Attorney, Agent, or Firm* — Yong Chen

(57) ABSTRACT

A mobile phone anti-drop and anti-theft protection system. The system includes a phone attachment glove, a mobile phone case for seating a mobile phone, and an inseparable attachment between a palm region of the phone attachment glove and the mobile phone case. Methods of using the system are also provided.

6 Claims, 4 Drawing Sheets

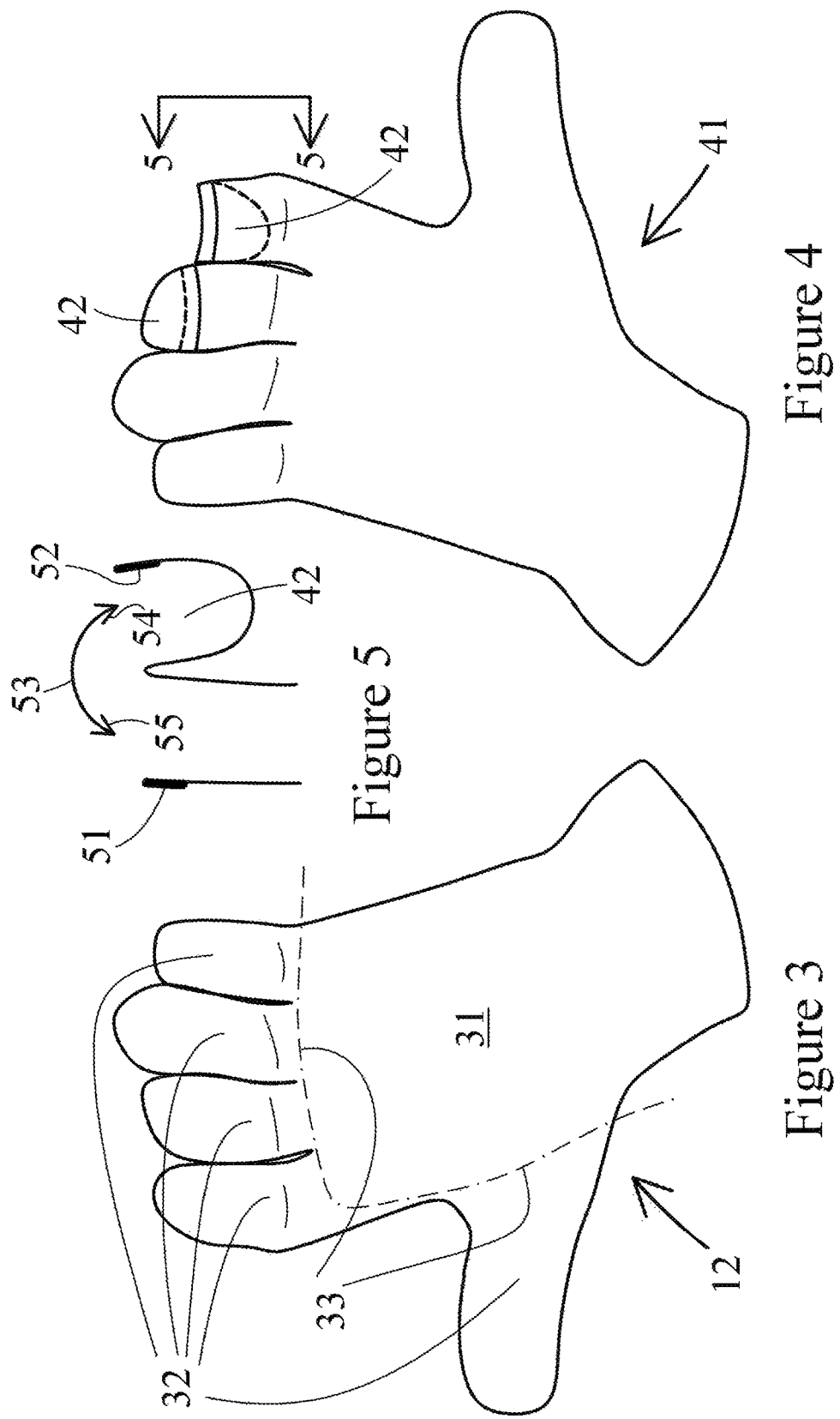

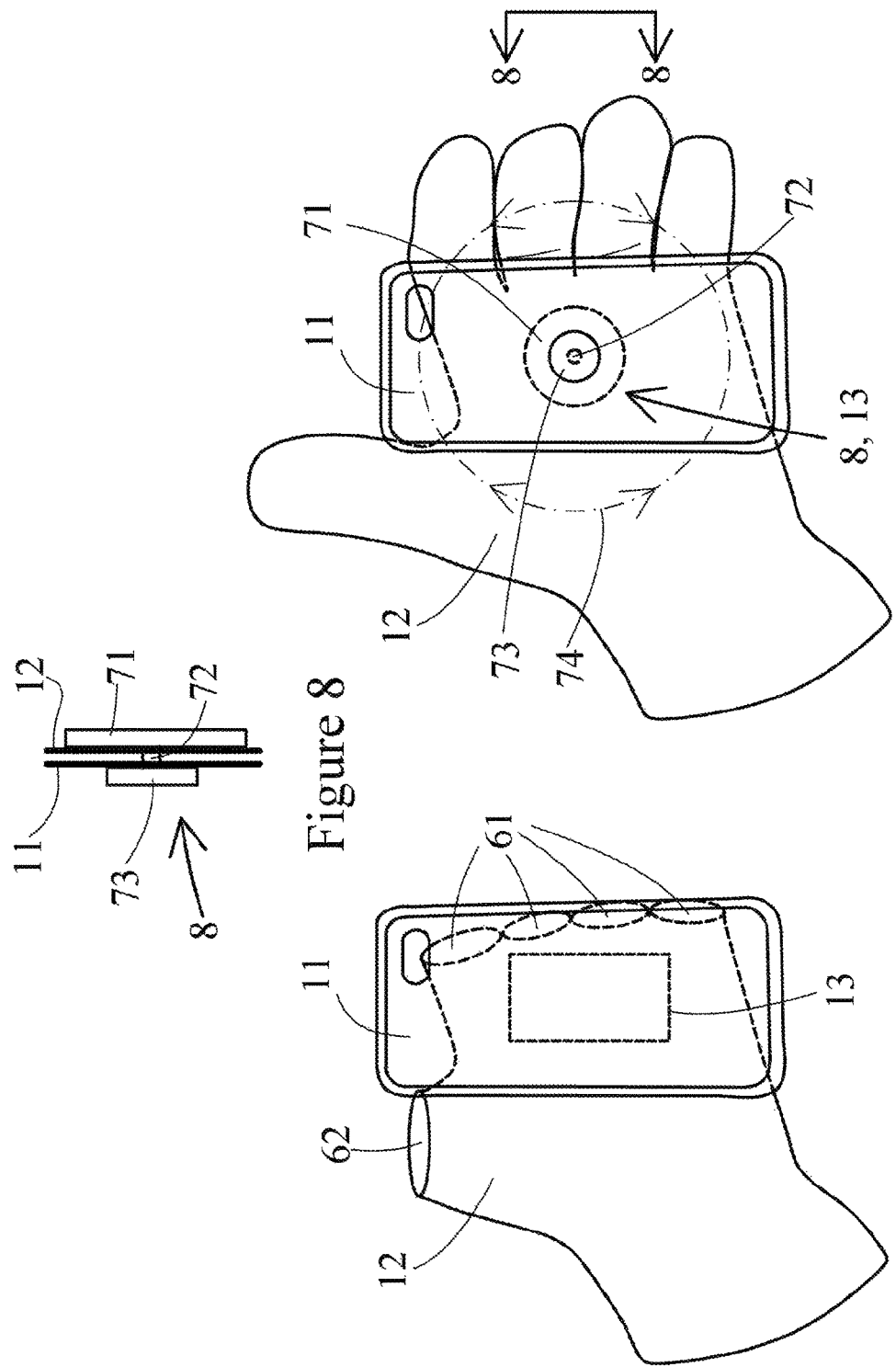

HAND GLOVE MOBILE SMARTPHONE ANTI-DROP AND ANTI-THEFT PROTECTOR DEVICE, SYSTEM AND METHOD

CROSS REFERENCE TO RELATED APPLICATIONS

This application is a continuation of International patent application No. PCT/US2017/020837, filed Mar. 4, 2017, which claims priority of U.S. provisional patent application No. 62/310,057 filed Mar. 18, 2016. The disclosure of each of these prior-filed applications is incorporated by reference in its entirety.

BACKGROUND OF THE INVENTION

Over the last several years the use of mobile phones has become ubiquitous. Mobile phones, especially the so-called smartphones that enable not only voice but also data communications including emailing and texting and typically have touch-screens responsive to a user's touch, are carried by people virtually everywhere they go. Indeed, people continuously checking emails and texts and looking for information on the internet using smartphones has now become a widespread, universally-recognizable cultural phenomenon.

The ubiquity of smartphone usage introduces a number of problems as well. First, it is not uncommon for a user to drop his or her phone, causing breakage. The user must then either continue to use the broken phone, have it replaced if insured, or purchase a replacement if it is not insured. It would therefore be desirable to have some way to make the dropping of these smartphones less likely.

Second, especially in public places, and on public transportation such as busses and subways and trains where people are in close physical proximity, there are a substantial number of incidents of smartphone theft. In both 2013 and 2014, over 2 million smartphone thefts were reported in the United States alone. (http://www.consumerreports.org/cro/news/2015/06/smartphone-thefts-on-the-decline/index.htm) Often, these thefts are in the form of "snatch and run," in which the thief takes advantage of the way in which smartphone users are often inattentive to their physical environment, and rather are focusing on their smartphone screens. This creates dangers beyond just the economic loss from the theft, because of the prospect that the victim will react by attempting to confront the thief, and the risk that this will give rise to physical violence. It would therefore also be desirable to make it much more difficult for a thief to snatch a smartphone from a user's hand, and by raising the difficulty, to deter such thefts in the first place.

While making the dropping of a phone less likely and raising the difficulty of a phone snatch, it is desirable to still enable the phone to be situated in the user's hand in the usual way, so that the ordinary usage of the smartphone is unimpeded. It should remain just as simple as always to talk on the phone, and to interact with the phone through the touch screen.

U.S. Pat. No. 9,038,871 discloses a so-called "glove" construction and kit for carrying outfitted electronic devices. As seen in FIG. 5, this device comprises a series of "finger-receiving sleeves 22" (column 4 lines 15-16) into which the user's fingers are inserted in order to carry the electronic device. These are attached to the electronic device at "matable fastening junction sites 17" (column 4 line 39), and it is disclosed that this "may be exemplified by VELCRO® brand hook and loop type fastening material (column 4 lines 28-30)." However, this configuration is problematic when it comes to considering smartphones and the way in which smartphones are used and the prevention of "snatch and run" thefts:

First, because of the impermanence of the attachment at the "matable fastening junction sites 17," this device is ineffective for preventing theft. A "snatch and run" thief would need to simply refine his or her snatch method to account for the need to separate the VELCRO® hooks from the loops, i.e., to separate the two mated VELCRO® halves. Second, the fitting around the fingers in the manner taught in U.S. Pat. No. 9,038,871 is actually dangerous. If, for hypothetical example, one were to replace the "matable fastening junction sites 17" with a permanent junction to eliminate the possibility of separation (which is permanent junction is not taught or suggested or motivated by U.S. Pat. No. 9,038,871), then it is easy to see from FIG. 5 that a hard yank on the electronic device by a thief could very easily break the user's fingers. So the so-called "glove" configuration actually taught in U.S. Pat. No. 9,038,871, while perhaps helpful to avoid dropping the device, is not only unhelpful for preventing theft, but is dangerous were it to be used as a theft prevention method. In this way, U.S. Pat. No. 9,038,871 actually teaches away from possible safer theft-prevention configurations. And in fact, there is no disclosure or suggestion or motivation in U.S. Pat. No. 9,038,871 that this invention might be used to prevent theft.

In fact, careful review reveals that much of the prior art for attaching electronic devices to a user to avoid dropping makes use of an attachment about the fingers, see, for example, U.S. Pat. Nos. 8,480,144; 8,528,798; 8,561,862; 8,833,620; 8,833,820; 8,887,970; 9,198,307; 9,226,567; D716,287; D735,695; and US pre-grant publications 2005/0205623; 2010/0222118; 2012/0031937; and 2014/0217135. However, given that fingers can be broken during a "snatch and run" attempt if the configurations of these disclosures were employed, it is noteworthy that there is no disclosure or suggestion or motivation in any of these documents either, that these configurations might be employed to prevent theft. All of these are simply carrying/anti-dropping aids, which may be used in a safe environment but which it would be inadvisable to use in an environment where the device may be prone to a "snatch and run."

A few patent documents, such as US 2015/0335138, are intended specifically for preventing theft, but are of the traditional variety of a case attached via a strap to a portion of the user's body. Indeed, ever since permanent straps or chains connected between a carrier's wrist and a carrying case have been used to prevent articles inside the carrying case from being snatched from the carrier, it has been understood that attaching materials to be protected from theft to some part of a user's body is a helpful security measure.

A number of prior art documents do attach electronic devices to the user's wrist or to other parts of the user's hand, but using straps or other cumbersome configuration which are unwieldy to mount, and/or which would not properly place a smartphone in a position to be operated with the user's other hand in an ergonomically natural manner. Examples of this include U.S. Pat. No. 6,796,467 (wrist straps); U.S. Pat. Nos. 7,469,809; 8,191,210; 8,567,832; 8,579,112; 8,783,533; and 9,010,595; (hand straps); U.S. Pat. Nos. 8,328,055; 8,474,669; and 8,714,421 (wristband); U.S. Pat. No. 8,662,362 (arm straps); U.S. Pat. No. 8,714,422 (wrist and finger straps); D745,014 (hand, thumb and wrist straps); and D749,592 (hand/finger straps); as well as pre-grant publications 2008/0017678; 2012/0255978 (wristband); 2014/0091116; 2015/0173497; 2015/0335137 (hand strap).

In view of the crowded art in this area of practice, the question whether some particular such security method which attaches a device to be protected to some part of a user's body, is patentable, i.e. novel and non-obvious/inventive, centers on the particular circumstances of the materials to be protected, the manner in the carrier may wish or need to access those materials while they are being carried, the best mode of bodily attachment for those materials in view of the above, the simplicity and ease of bodily attachment and detachment, and the proper ergonomic positioning of the device being carried and protected.

So when it comes to smartphones, the goal in not merely to prevent theft by attaching these phone to the user in some way. Rather, the goal is to prevent theft while the user is following the customary behavioral pattern of holding a smartphone in the palm of one hand, and using the other hand to operate the phone via its touch screen, all while being inattentive to the people in the nearby physical environment. All of these circumstances make the smartphone particularly vulnerable to a "snatch and run" theft. And, a further goal is to do this safely, so that the price of preventing a "snatch and run" is not a broken hand for the user.

Thus, it is important to find specific configurations for a device, system and method to make the smartphone inseparable from the user while the smartphone is being held in the user's hand and being used in the customary manner in a populated environment, and to do so a manner that is protective of the phone and of the user. The prior art to date, does not appear to disclose, suggest or motivate a good solution for these problems.

SUMMARY OF THE INVENTION

An apparatus and related method of use in which a carrying and/or protective case for mobile phones is inseparably affixed to the palm region of a glove worn upon a human hand. When a mobile phone is placed into the case and the glove is worn by a user, not only does the case protect the phone in the manner known in the prior art while simultaneously enabling the user to operate the touch screen in an ergonomically natural manner, but the inseparable attachment of the case to the glove palm renders it far more difficult for somebody else to steal the phone. This is important because people often hold smartphones in their hand in public places while texting or emailing or searching the internet or placing phone calls, etc., and often are inattentive to threats posed by hostile parties who might try to capitalize in their inattention by stealing the phone.

More specifically, disclosed herein is a mobile phone anti-drop and anti-theft protection system and related method, comprising: a phone attachment glove configured to fit over at least the entire palm of a user's hand; a mobile phone case into which a mobile phone with a touch screen can be securely seated, the mobile phone case configured to substantially cover and thereby protect at least a back surface of the mobile phone from damage while leaving the touch screen accessible to touch operation when the mobile phone is so-seated; an inseparable attachment between a palm region of the phone attachment glove and the mobile phone case; and the inseparable attachment not being over any portion of a finger region of the phone attachment glove; wherein: when a user is wearing the phone attachment glove and mobile phone case combination on his or her first hand simultaneously with the mobile phone being seated within the mobile phone case, the configuration of the user's first hand in relation to the combination of the phone attachment glove with the mobile phone case with the mobile phone with the inseparable attachment increases the protection for the phone from damage, from dropping, and from theft, and protects the user's fingers from being harmed during any attempted theft, while simultaneously enabling the user to operate the touch screen with his or her second hand in an ergonomically natural manner.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

FIG. 3 is a front plan view illustrating the regions of the glove which are acceptable and are not acceptable for placement of the inseparable attachment.

FIG. 4 is a front plan view illustrating an opposite-handed glove from that of FIG. 1 which is used on the opposite hand which is not holding the phone, so that this opposite hand can be used to operate the touchscreen of the phone.

FIG. 5 provides a cross sectional view along the lines 5-5 of FIG. 4 to illustrate the partial detachment of one or more glove fingertips to allow the opposite hand to operate the touchscreen of the phone.

FIG. 6 illustrates a front plan view of a glove as in FIG. 1, but with the fingers truncated, i.e., left open, for use in warmer weather.

FIG. 7 is a front plan view illustrating a second preferred embodiment of the invention in which the mobile phone case is inseparably attached to the palm of a glove, using a rivet in a configuration permitting rotation of the phone case relative to the glove.

FIG. 8 provides a cross sectional view along the lines 8-8 of FIG. 7 to illustrate the rivet and its placement relative to the phone case and the glove.

DETAILED DESCRIPTION

Figure 2:
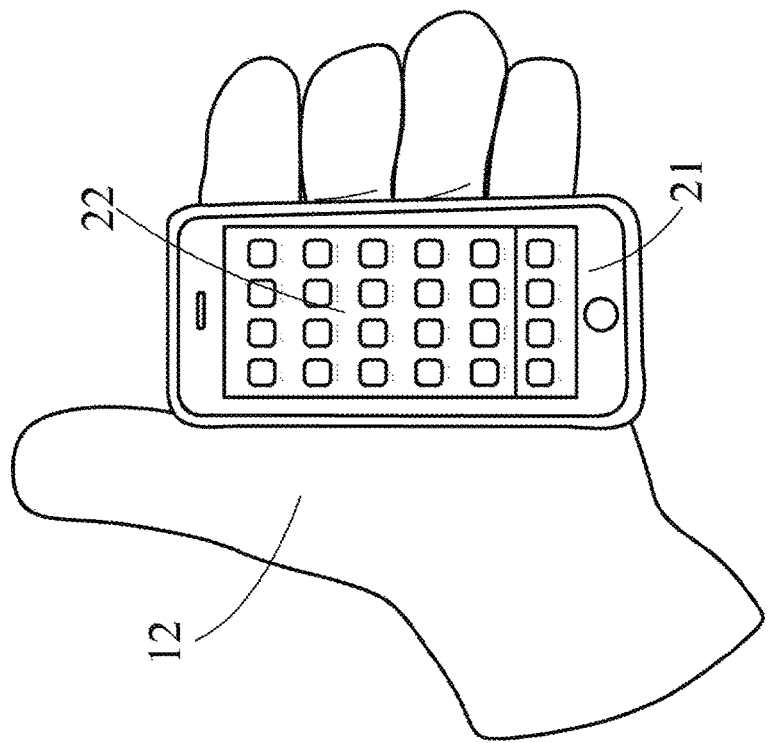
FIG. 2 is a front plan view illustrating a mobile phone seated within the mobile phone case of FIG. 1.
Figure 1:
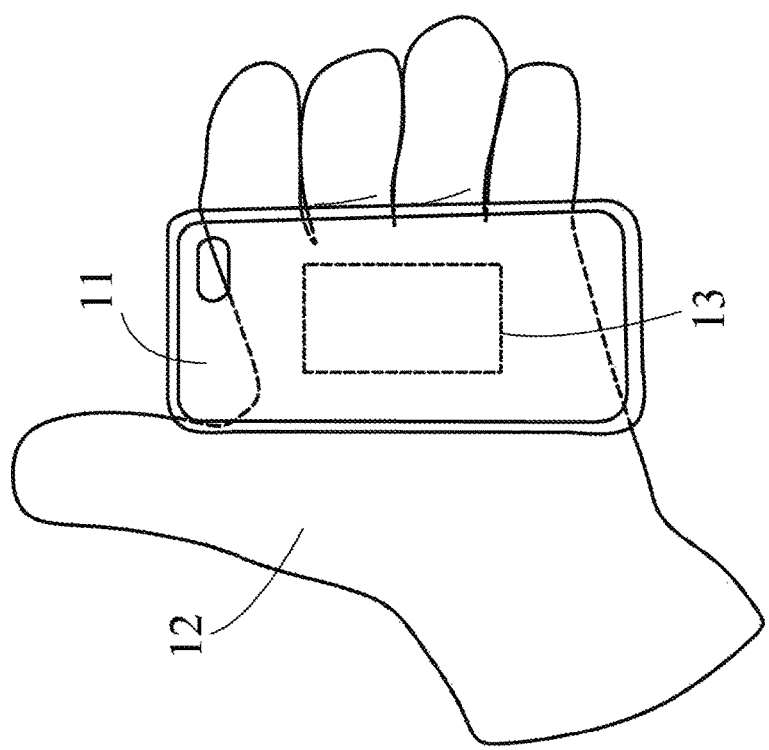
FIG. 1 is a front plan view illustrating a first preferred embodiment of the invention in which a mobile phone case is inseparably attached to the palm of a glove, using permanent stitching.

To simultaneously solve the problems of preventing a smartphone from being stolen and keeping the user of the phone from suffering a broken hand in the event of a failed "snatch and run" attempt to steal the smartphone, all while allowing the user to still use the smartphone in a public place, we begin by examining a first preferred embodiment of the invention as illustrated in FIGS. 1 and 2.

Mobile phone cases 11 such as that illustrated in FIG. 1 are well-known and widely used in the art. Such mobile phone cases 11 are configured to substantially cover and thereby protect at least back surface and possibly one or more of the four side surfaces of a mobile phone 21 from damage while leaving the touch screen accessible to touch operation. Once a mobile phone 21 such as the smartphone illustrated in FIG. 2 has been seated into a phone case 11, it is nearly impossible for a person to remove the mobile phone 21 from the phone case 11 without that person having direct, hands-on access to the phone case 11 containing the phone 21. Certainly, a person intending to steal the phone 21 could not snatch the phone 21 from the phone case 11 while casually running by the combination of the phone case 11 and the phone 21.

Given this, the invention of this disclosure provides a glove 12 configured to fit upon at least the entire palm of a user's hand; a mobile phone case 11 into which a mobile phone 21 with a touch screen 22 can be securely seated; and an inseparable attachment 13 between a palm region of the glove 12, as illustrated, and the mobile phone case 11. It is also important to not have the attachment 13 be over any portion of a finger region of the glove 12, so that the user's fingers are protected from being broken in the event of an attempted "snatch and run." While FIGS. 1 and 2 (and other subsequent figures) illustrate a left-handed glove, it is understood and disclosed that this may also be done with a right-handed glove. As a general rule, right-handed users tend to hold smartphones in their left hands and use their free right hands to operate the touch screen; for left-handed users this tendency is generally reversed.

As a consequence of the foregoing configuration, when a user is wearing this glove 12 and case 11 combination on a first one of his or her hands (for example, wearing the illustrated left-handed glove on the left hand) simultaneously with the mobile phone 21 being seated within the mobile phone case 11, the configuration of the user's first hand in relation to the combination of the glove 12 with the phone case 11 with the mobile phone 21 with the inseparable attachment 13 increases the protection for the phone 21 from damage, from dropping, and from theft, and protects the user's fingers from being harmed during any attempted theft, while simultaneously enabling the user to operate the touch screen 22 with his or her second hand (in this example, the right hand) in an ergonomically natural manner.

It is emphasized that the phone case 11 is attached to the glove 12 at the palm region of the glove 12, and not at the finger region in the manner of U.S. Pat. Nos. 9,038,871 and 9,226,567 for example. As discussed, were a thief to try to snatch a device attached to the fingers, the force of an unsuccessful "snatch and run" attempt could still break the user's fingers even though the snatch had failed, and it is important to keep the phone and the user both safe. Second, with the phone case 11 and the phone 21 seated in the palm region, the user's fingers can readily wrap around what is shown to be the right side of the phone in FIG. 1, which is also a more secure position against snatching than a position on the fingers.

The inseparable attachment 13 between the glove 12 and the phone case 11 is an important element of this invention, because unlike a VELCRO® or similar attachment, a permanent attachment prevents the phone case 11 and the phone 21 from simply being ripped away from the glove. There are a number of ways in which this permanent attachment may be embodied.

In FIG. 1, the inseparable attachment illustrated by 13 is not some type of hidden line. Rather, this is an actual firm, permanent stitching between the glove 12 and the phone case 11, and the dashed lines of 13 are representative of actual stitching. However, this illustrating of permanent stitching is representative of a range of ways in which the phone case 11 may be attached to the glove 12 in such a way that the phone case 11 and the phone 21 together, or the phone 21 alone, cannot be easily snatched from the glove 12. These alternative embodiments to achieve this attachment will be reviewed shortly.

It has been stated that it is important for the attachment 13 to not be over any portion of a finger region of the glove 12, in order to protect the user's fingers from possibly being broken during a snatch and run attempt. To facilitate clarity, FIG. 3 illustrates the regions of glove 12 which are acceptable for placement of the inseparable attachment 13, and which are not acceptable. Specifically, FIG. 3 illustrates acceptable attachment regions 31, unacceptable attachment regions 32, and the boundary 33 between these two regions. In words, it will be seen that for a glove held with the fingers facing up and the wrist facing down, the acceptable region 31 for the inseparable attachment 13 is situated below the base of each finger and thumb, below the junctures between adjacent fingers and the juncture between the pointer finger and the thumb, and toward the wrist in relation to all five of these user's hand digits.

There are a number of benefits to employing an ordinary glove 12 as the means for securing a mobile phone 21 to a user's hand via a phone case 11 permanently attached to the palm region of a glove 12 which fits naturally and comfortably about a user's hand. First, inserting a hand into a glove and removing a glove from a hand are natural, simple actions understood by everyone. No special instructions need to be read and followed. Everyone knows how to put on a glove and take off a glove. This is an important contrast to the multiple prior art documents reviewed above which employ cumbersome combinations of straps and bands to facilitate attachment. Many of those prior art attachment devices could not be used until their instructions had been read and understood, and their attachment and detachment is not a simple or as quick as putting on or taking off a glove which can be done in less than a second.

Second, the customary behavioral pattern of holding a smartphone in the palm of one hand, and using the other hand to operate the phone via its touch screen, lends itself ideally to using an ordinary glove 12 to secure the phone 21 to the user's hand. By having the inseparable attachment 13 situated in the palm region of the glove 12, the phone 21 is naturally situated to optimize the ergonomics of using the phone 21, because the phone 21 is automatically placed into the position relative to the user's hand where it would be placed even without this present invention. And at the same time, by securing the phone 21 to the palm not the fingers, the user's fingers are protected from being broken in the event of a failed "snatch and run," and the anti-theft features of the invention are enhanced because the palm of the user's hand can offer far more effective resistance to a snatch than the fingers of the user's hand.

Third, because gloves are already used to maintain hand warmth during colder weather, using a glove 12 to attach the phone 21 to the hand has the collateral benefit of keeping that hand warm when this invention is being used.

However, because it is customary (except when golfing) to use a pair of gloves and not a single glove in order to warm the hands, it is also desirable to provide a glove for the second hand—the hand not holding the phone 21—which when added to glove 12 not only warms both hands, but enables the user to operate the smartphone 21 while wearing both gloves. Toward this end, FIG. 4 illustrates an opposite-handed glove 41 which is paired with the original glove 12 but used on the opposite hand which is not holding the phone but is operating the phone. For convenience, we may sometimes refer to the glove 21 as the "phone attachment glove" 21 and the opposite-handed glove 41 as the "phone operation glove" 41. Again, while we have illustrated the phone being attached to the left hand and operated with the right hand, this in no-way precludes and fully discloses a reverse-handed configuration.

In FIG. 4, we see that the index and the middle fingers each have a convertible tip 42 which can either be attached so as to cover the fingertip along with the rest of the glove 41 as is illustrated for the middle finger, or can be detached from about half of the circle defined by the cross section of the front of the finger and then rested against the back of the glove 41 as is illustrated for the pointer finger. The exemplary illustration of these convertible tips 42 on the pointer and middle fingers does not preclude, and is intended to fully disclose, the possibility of providing a similar convertible tip 42 for one or more of the remaining fingers as well, if desired, and also, of providing a convertible tip 42 on only one of the fingers.

When the user is simply wearing the glove 42 and wishes to keep the entire hand covered, then all convertible tips 42 are moved into their upright positions and attached to the front part of the finger on the glove, using, for example, a VELCRO®-type hook 51 and loop 52 material, as is shown for the middle finger in FIG. 4. When the user wishes to expose one or more of the fingertips of his or her hand to be able to operate the touch screen of the smartphone 21, the user simply peels apart the hook 51 and loop 52 material, and rests the partially-detached glove 41 fingertip against the back of the finger on the glove 41. This is illustrated by FIG. 5 which shows the detachment from the pointer finger as illustrated from the view labeled 5-5 in FIG. 4. The arc 53 in FIG. 5 shows the direction of detachment 54 and reattachment 55.

Conversely, in the event that this invention is used in warmer weather, it will not be desirable to wear a glove on the operating hand, and to wear as light a glove as possible on the phone attachment hand. Thus it is envisioned that all manner of glove fabrics, over all ranges of thicknesses, are suitable for use in connection with this invention. Toward this end, it is also envisioned and understood that the phone attachment glove 21 may be a truncated palm glove in which the glove fingers are detached and left open, i.e., with finger openings 61 and a thumb opening 62, which truncated phone attachment glove 21 fits only over the entire palm as shown in FIG. 6. In all cases, to optimize anti-theft protection and protect the vulnerability of the user's fingers, the glove 21 is configured to fit upon at least the entire palm of the user's hand. The fingers may then also be covered or not, in whole or in part.

FIG. 7 is a plan view illustrating a second preferred embodiment of the invention in which the mobile phone case 11 is inseparably attached 13 to the palm of the glove 12, using a two-cap rivet 8 in a configuration permitting rotation of the phone case 11 relative to the glove 12, i.e., permitting a swivel of the phone case 11 in the user's hand holding the phone. Coupled with this, FIG. 8 provides a cross sectional view along the lines 8-8 of FIG. 7 to illustrate the rivet 8 and its placement inseparably attaching 13 phone case 11 with the glove 12.

Starting with FIG. 8, we illustrate a two-cap rivet 8 comprising a rivet nail 72 between a glove-side cap 71 and a case-side cap 73. We also illustrate a truncated section of the glove 12 just to the left of the glove-side cap 71 and a truncated section of the phone case 11 just to the right of the case-side cap 73. The glove-side cap 71 has a preferred diameter of about 1 inch and the case-side cap 73 of about half an inch, but both of these diameters may be varied as desired within the scope of this disclosure as long as the rivet 8 creates an effective inseparable attachment between the glove 12 and the mobile phone case 11 and permits a swivel as will be detailed further below.

Referring back to FIG. 7, we see the inseparable attachment 13 comprising rivet 8 permanently attaching the phone case 11 to the glove 12. From this front view the case-side cap 73 is most forward, and so is visible in front of the phone case 11. Attached to the back of the case-side cap 73 is the rivet nail 72 (shown in hidden lines) which passes through both the back of the phone case 11 and the front of the glove 12, and is attached also to the front of the glove-side cap 71 (also shown in hidden lines) which is rearmost from this view. For cosmetic/appearance reasons, and to protect the back of the phone 21 from scratching, the case-side cap 73 may be covered by an additional layer of whatever material is used to construct the phone case 11. The length of the rivet nail 72 is short enough so the phone case 11 and glove 12 are snugly touching one another (the small space between the phone case 11 and glove 12 sections in FIG. 8 is for illustration only), yet provides just enough play to permit the illustrated relative rotation 74 i.e., swivel of the phone case 11 relative to the glove 12. In this way, the rivet 8 prevents the phone case 11 and therefore any phone 21 fixed inside from being snatched just as does the stitching shown in FIGS. 1 and 6 as the inseparable attachment 13 embodiment. But the rivet 8 embodiment also provides the convenience of allowing the user to hold the phone 21 with the glove 12 in swiveled 74 to whatever angle the user desires.

Rivets of the type shown in FIGS. 7 and 8, and their manner of attachment to hold two separate bodies together, are well-known in the art. Given this disclosure, it should be clear to a person of ordinary skill how to use them to practice this particular invention.

Figure 10:
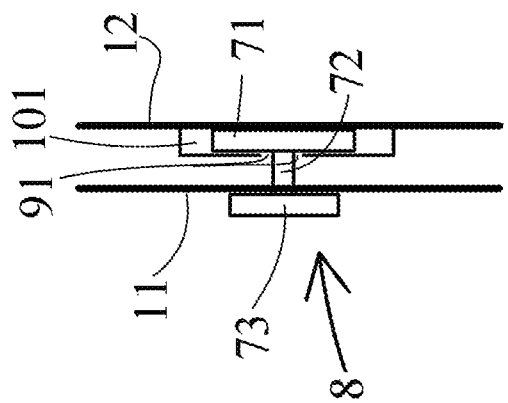
FIG. 10 provides a cross sectional view along the lines 10-10 of FIG. 9 to illustrate the rivet and phone case movement channel their configuration relative to the phone case and the glove.
Figure 9:
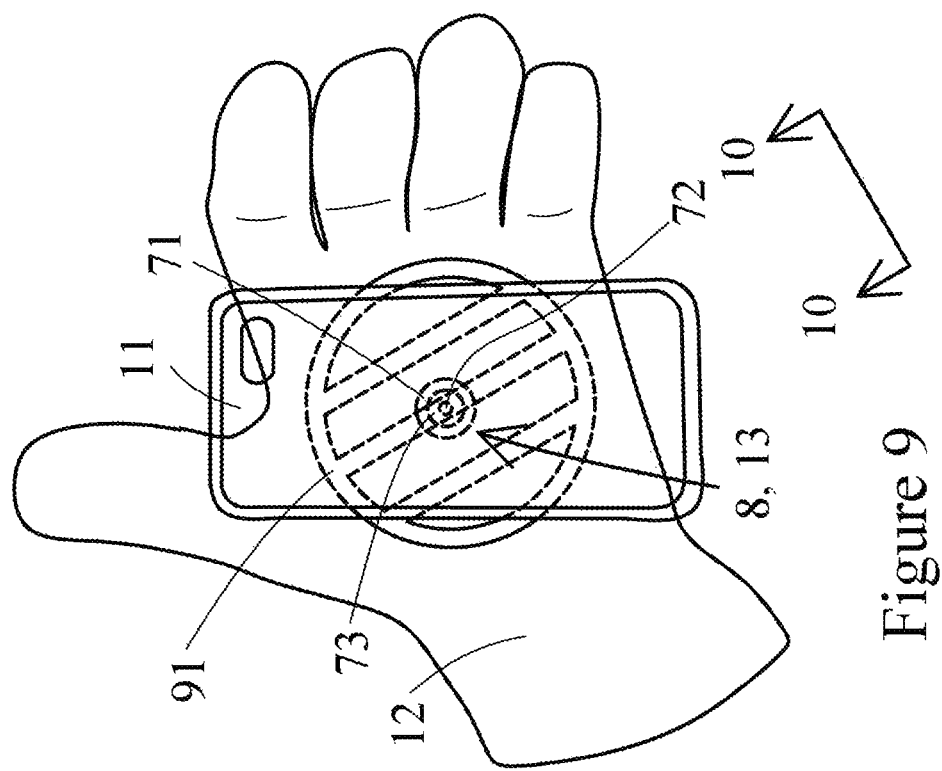
FIG. 9 is a front plan view illustrating a third preferred embodiment of the invention in which the mobile phone case is inseparably attached to the palm of a glove, using a rivet together with a phone case movement channel.

FIGS. 9 and 10 illustrate a third preferred embodiment of the invention in which the mobile phone case 11 is inseparably attached to the palm of the glove 12, with the inseparable attachment 13 comprising a rivet 8, together with a phone case movement channel 91 that is permanently affixed to the palm of the glove 12. This is similar to the embodiment of FIGS. 7 and 8, except now there the phone case movement channel 91 is provided to allow the position of the phone case 11 to be moved relative to the palm of the glove 12 at will, based on an individual user's ergonomic preferences.

As one way to implement this, FIG. 10 provides a cross sectional view along the lines 10-10 of FIG. 9 to illustrate the rivet 8 and phone case placement channel 91 and their positioning relative to the phone case 11 and the glove 12. We see that a channel housing 101 (not shown in FIG. 9 to avoid clutter) contains a slotted opening which is the phone case placement channel 91. This channel housing 101 is permanently affixed to the palm of the glove 12. The glove-side cap 71 is situated inside channel housing 101 with the rivet nail 72 passing through the channel 91 and the case-side cap 73 affixed on the opposite side of the phone case 11 as in FIGS. 7 and 8. It will be appreciated that by virtue of this configuration of elements, or similar configurations which can be implemented by persons of ordinary skill and are regarded to be within the scope of this disclosure and claims, the phone 11 case may be slid at will by the user by repositioning where the rivet 8 is situated in the channel 91.

The fittings among all of these elements of this embodiment should be loose enough to permit movement of the phone case 11 over the phone case placement channel 91 yet snug enough to maintain the relative position of the phone case 11 in relation to the glove 12 once the user sets the position. This may be implemented in a number of ways which following this disclosure will be apparent to persons of ordinary skill, for example, using a glove-side cap 71 with a frictional material such as rubber, and/or using ratcheting features to stabilize position, and/or using springs of various type for applying enough pressure for stability but not too much pressure which would prevent movement through the channel 91. As was the case in FIGS. 7 and 8, this embodiment also still allows the phone case 11 to swivel.

While the phone case placement channel 91 as illustrated in FIG. 9 runs only over the palm region because as discussed an attachment on the fingers can cause the user's finger to be hurt during a "snatch and run" attempt, it is possible to provide channel movement also to the finger regions which finger placements may be employed by the user when the user is in a private space, e.g., in his or her home, and there is no snatch danger as there is in a public space. Also, the circular shape for the channels 91 shown in FIG. 9 is illustrative not limiting, and this disclosure and the associated claims are intended to cover other channel 91 configurations as well. Finally, while a rivet is illustrated for the attachment between the phone case 11 and the channel 91, this is also non-limiting and is intended to also cover other implementations which reach the same result.

For all embodiments, it is to be understood that there is no limitation imposed by this disclosure or the associated claims on the type or make or model of the mobile phones 21 which can be protected in accordance with this invention. Nor is there any limit on the type of mobile phone cases 11 which can be attached to the glove 12 in accordance with this invention. Any phone case 11 that can securely seat a mobile phone 21 so that that phone 21 can be carried in the case 11 and/or protected by the case 11, is regarded to be within the scope of this disclosure and its associated claims. And of course, any glove 12 configured to fit over at least the entire palm of a user's hand, of any size and any thickness and any material, whether a full glove or a glove with one or more fingers omitted (e.g. as in FIG. 6), is also regarded to be within the scope of this disclosure and its associated claims.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

What is claimed is:

1. A mobile phone anti-drop and anti-theft protection system, comprising:
   a phone attachment glove configured to fit over at least the entire palm of a user's hand;
   a mobile phone case into which a mobile phone with a touch screen can be securely seated, said mobile phone case configured to substantially cover and thereby protect at least a back surface of the mobile phone from damage while leaving the touch screen accessible to touch operation when the mobile phone is so-seated;
   an inseparable attachment between a palm region of said phone attachment glove and said mobile phone case, said inseparable attachment comprising a rivet including a glove-side cap coupled to said phone attachment glove, a case-side cap coupled to said mobile phone case, and a rivet nail connecting the glove-side cap and the case-side cap, wherein said rivet enables said mobile phone case to swivel relative to said phone attachment glove; and
   said inseparable attachment not being over any portion of a finger region of said phone attachment glove.

2. The system of claim 1, said glove-side cap of said rivet is coupled to said mobile phone case via a phone case movement channel, said phone case movement channel permanently affixed to the palm of said glove.

3. The system of claim 1, said phone attachment glove further comprising at least one finger opening enabling at least part of one or more of the user's fingers to be not covered by said phone attachment glove.

4. The system of claim 1, further comprising:
   a phone operation glove configured to fit over at least the entire palm of the user's opposite hand from said phone attachment glove; and
   at least one convertible tip at the end of at least one of the finger tips of said phone operation glove, configured to cover the corresponding fingertip of the user's hand at will when the user wishes to have that fingertip covered, and configured to enable the corresponding fingertip of the user's hand to be exposed at will while leaving the remainder of that finger covered inside the phone operation glove, when the user wishes to have that fingertip uncovered so it can be used to operate the touch screen of the mobile phone.

5. The system of claim 4, further comprising a hook and loop material for attaching said at least one convertible tip to the remainder of the finger of said phone operation glove to cover the corresponding fingertip of the user's hand at will, and for detaching said at least one convertible tip so as to expose the corresponding fingertip of the user's hand at will.

6. A method for protecting a mobile phone from dropping and from theft, comprising:
   providing a mobile phone case into which a mobile phone with a touch screen can be securely seated, inseparably attached to a palm region of a phone attachment glove configured to fit over at least the entire palm of a user's hand, said mobile phone case configured to substantially cover and thereby protect at least a back surface of the mobile phone from damage while leaving the touch screen accessible to touch operation when the mobile phone is so-seated, said inseparable attachment comprising a rivet including a glove-side cap coupled to said phone attachment glove, a case-side cap coupled to said mobile phone case, and a rivet nail connecting the glove-side cap and the case-side cap, wherein said rivet enables said mobile phone case to swivel relative to said phone attachment glove; said inseparable attachment not being over any portion of a finger region of said phone attachment glove;

seating the mobile phone within said mobile phone case; and putting a user's first hand into said phone attachment glove of said phone attachment glove and mobile phone case combination on his or her first hand.

* * * * *